United States Patent
Chang et al.

(10) Patent No.: US 9,039,222 B2
(45) Date of Patent: May 26, 2015

(54) BACKLIGHT MODULE WITH LIGHT-GUIDING PORTIONS

(71) Applicant: ADVANCED OPTOELECTRONIC TECHNOLOGY, INC., Hsinchu Hsien (TW)

(72) Inventors: Chao-Hsiung Chang, Hsinchu (TW); Pin-Chuan Chen, Hsinchu (TW); Li-Hsiang Chen, Hsinchu (TW)

(73) Assignee: ADVANCED OPTOELECTRONIC TECHNOLOGY, INC., Hsinchu Hsien (TW)

( * ) Notice: Subject to any disclaimer, the term of this patent is extended or adjusted under 35 U.S.C. 154(b) by 102 days.

(21) Appl. No.: 13/926,084

(22) Filed: Jun. 25, 2013

(65) Prior Publication Data

US 2014/0063849 A1    Mar. 6, 2014

(30) Foreign Application Priority Data

Sep. 4, 2012    (CN) .......................... 2012 1 0321710

(51) Int. Cl.
G09F 13/08    (2006.01)
F21V 8/00    (2006.01)
F21V 5/00    (2006.01)

(52) U.S. Cl.
CPC ................ *G02B 6/0011* (2013.01); *F21V 5/00* (2013.01)

(58) Field of Classification Search
CPC ...................................................... G02F 1/133
USPC .................................. 362/97.3, 612, 626, 615
See application file for complete search history.

(56) References Cited

U.S. PATENT DOCUMENTS

| | | | |
|---|---|---|---|
| 8,675,149 B2* | 3/2014 | Jung et al. ........................ | 349/62 |
| 8,684,549 B2* | 4/2014 | Koma et al. ................... | 362/97.1 |
| 2002/0181222 A1* | 12/2002 | Boyd et al. ....................... | 362/31 |
| 2009/0213571 A1* | 8/2009 | Jin et al. ........................ | 362/97.1 |

\* cited by examiner

*Primary Examiner* — Evan Dzierzynski
(74) *Attorney, Agent, or Firm* — Novak Druce Connolly Bove + Quigg LLP (57) ABSTRACT

A backlight module includes a substrate, a plurality of LED packages mounted on the substrate and a light diffusion board located above the LED packages. The light diffusion board includes a light incident surface facing toward the LED packages and a light output surface. A plurality of light-guiding portions is configured extending from the incident surface of the light diffusion board toward the LED package. Each light-guiding portion comprises a concave surface at an outer periphery thereof. A diameter of each light-guiding portion decreases gradually from light diffusion board toward the LED packages. The concave surface of each light-guiding portion is recessed inwardly from the outer periphery of the light-guiding portion. Light from the LED packages and emitting into the light-guiding potions is divergently and uniformly adjusted into the light diffusion board by the concave surfaces of the light-guiding portions.

16 Claims, 7 Drawing Sheets

BACKLIGHT MODULE WITH LIGHT-GUIDING PORTIONS

BACKGROUND

1. Technical Field

The disclosure generally relates to lighting sources, particularly, to a backlight module with light-guiding portions.

2. Description of Related Art

A typical backlight module includes a substrate, a plurality of light emitting diode (LED) packages arranged on the substrate, and a light diffusion board spaced and over the LED packages. The light diffusion board includes a flat light incident surface facing toward the LED packages and a flat light output surface opposite to the flat incident surface. Light emitted from the LED packages emits into the light diffusion board from the flat incident surface of the diffusion board, and then, the light can be diffused by the light diffusion board to emit out from the flat light output surface.

However, each LED package generates a smooth round light field, and the light emitted from the LED package is mainly concentrated at a center thereof. The light at a periphery of the LED package is relatively poor to illuminate. Therefore, the light emitted from the LED packages can not be uniformly emitted into the light diffusion board. When this happens, the performance of the backlight module deteriorates. Particularly, the LED packages are made to be more and more powerful. If the light diffusion board and the LED packages are located too close to each other, white spot mura may appear in the LCD which is lightened by the backlight module. If the distance between the light diffusion board and the LED packages is increased, a bulk of the backlight module must be increased accordingly, which is opposite the trend of compact design.

What is needed, therefore, is a backlight module with light-guiding portions which can overcome the described-above shortcomings.

DETAILED DESCRIPTION

Embodiments of backlight modules in accordance with the present disclosure will now be described in detail below and with reference to the drawings.

Figure 1:
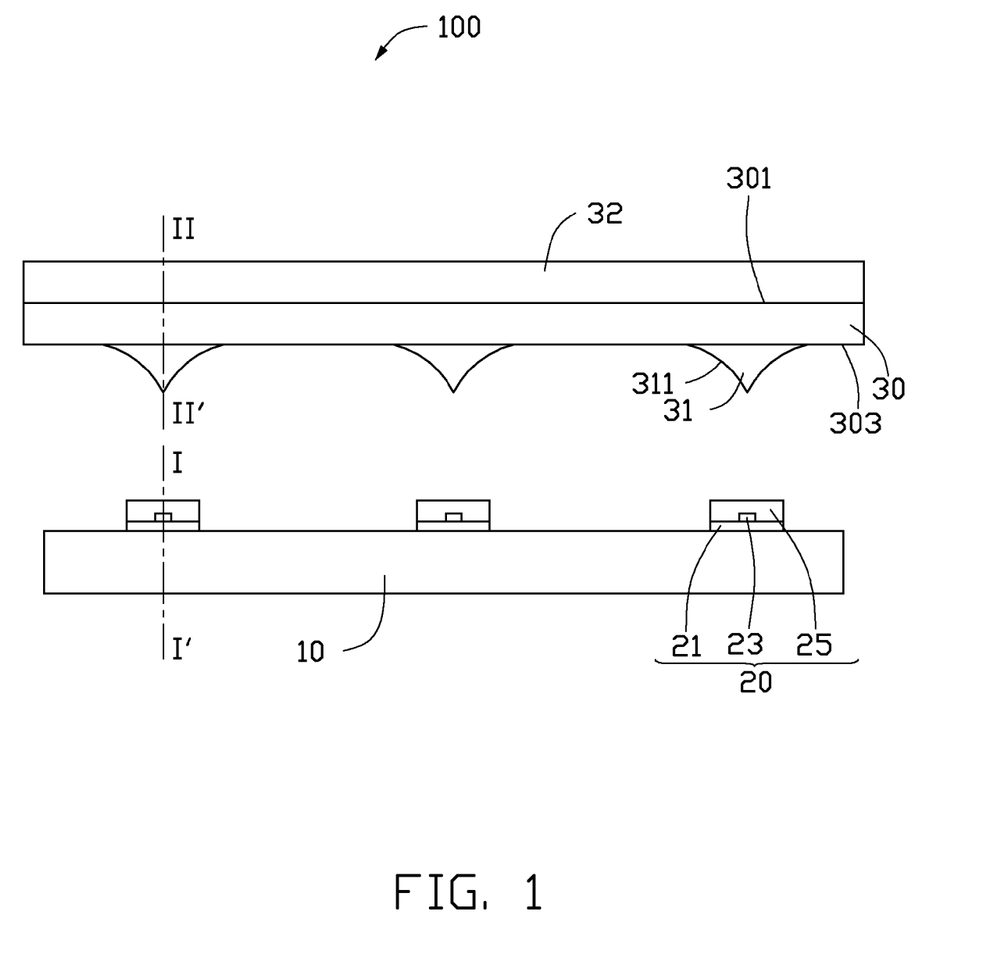
FIG. 1 is a schematic, assembled view of a backlight module in accordance with a first embodiment of the present disclosure.

Referring to FIG. 1, a backlight module 100 in accordance with a first exemplary embodiment is provided. The backlight module is used for illuminating a liquid crystal display (LCD, not shown). The backlight module 100 includes a substrate 10, a plurality of separate LED packages 20 mounted on a top surface of the substrate 10, and a light diffusion board 30 located over the LED packages 20.

The substrate 10 is a flat plate. A circuit (not shown) is arranged on the top surface of the substrate 10. In this embodiment, the substrate 10 is made of electrically insulating materials, such as silicone, epoxy or ceramic.

The LED packages 20 are electrically connected to the circuit on the substrate 10. The LED packages 20 are equidistantly spaced from each other. The LED package 20 includes a metal base 21, an LED chip 23 mounted on the base 21, and an encapsulant layer 25 encapsulating the LED chip 23 therein. The metal base 21 is arranged directly on the top surface of the substrate 10.

The light diffusion board 30 is a rectangular board. The light diffusion board 30 has a top surface 301 and a bottom surface 303 opposite to the top surface 301. The top surface 301 of the light diffusion board 30 is far away from the LED packages 20, and the bottom surface 303 faces toward the LED packages 20. The top surface 301 of the light diffusion board 30 functions as a light outputting surface, and the bottom surface 303 functions as a light incident surface. A light diffusion film 32 is coated on the top surface 301 of the light diffusion board 30 to enhance a diffusing efficiency of the light diffusion board 30. In this embodiment, the light diffusion board 30 is made of material with a high refractive index.

A plurality of light-guiding portions 31 extends downwardly from the light incident surface of the light diffusion board 30. Each light-guiding portion 31 is aligned with and spaced from the corresponding LED package 20. Light travelling to the light-guiding portion 31 is adjusted by the light-guiding portion 31 to be evenly emitted out therefrom.

Figure 2:
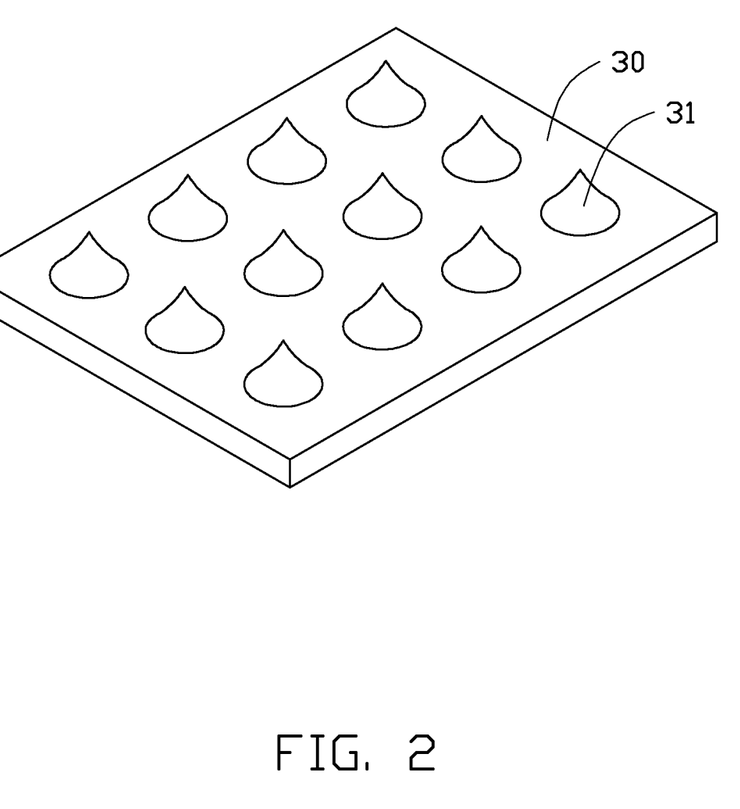
FIG. 2 is a perspective view of a diffusion board with light-guiding portions of the backlight module of FIG. 1.

Also referring to FIG. 2, the light-guiding portions 31 are extending from the bottom surface 303, and are oriented toward the LED packages 20 correspondingly. The light-guiding portions 31 are spaced from each other with the same distance therebetween.

Each light-guiding portion 31 is funnel shaped, and is symmetrical about an axis II-II'. The axis II-II' of the light-guiding portion 31 is coincided with the optical axis I-I' of the corresponding LED package 20. The axis II-II' extends through a bottom tip and a center of the light-guiding portion 31. The axis I-I' extends through a center of the LED chip 23. A diameter of the light-guiding portion 31 is decreased from a top end connecting the light incident surface of the light diffusion board 30 to the bottom tip oriented toward the LED package 20. Each light-guiding portion 31 includes a concave surface 311. The concave surface 311 is recessed inwardly from an outer periphery of the light-guiding portion 31. Preferably, the curvature of the concave surface 311 is varied from 0.5 mm$^{-1}$ to 1.5 mm$^{-1}$.

Figure 3:
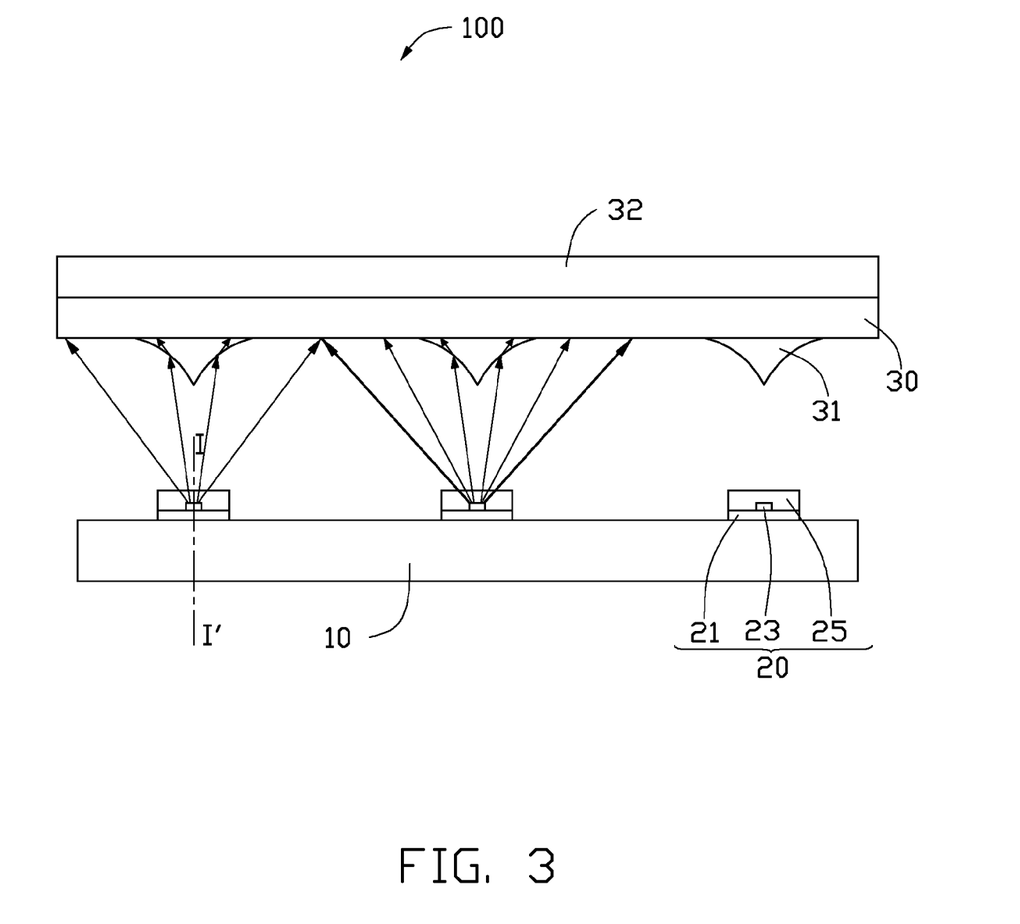
FIG. 3 is a front side view of the backlight module wherein light path of the backlight module is shown.

Referring to FIG. 3, according to the backlight module 100 of the first embodiment of the disclosure, a part of light emitted from each LED package 20 and located near the center of each LED package 20 is emitted into the corresponding light-guiding portion 31, and then, this part of light can be divergently refracted by the concave surfaces 311 to reach a periphery of the top end of the light-guiding portion 31, whereby the radiation angle of this part of light into the light diffusion board 30 can be enlarged. Another part of light at a periphery of the LED package 20 is directly emitted into and mixed in the region of the light diffusion board 30 between adjacent light-guiding portions 31 and beside the corresponding light-guiding portion 31. Thus the overall light emitted from the LED packages 20 is uniformly and divergently emitted into the light diffusion board 30.

Figure 4:
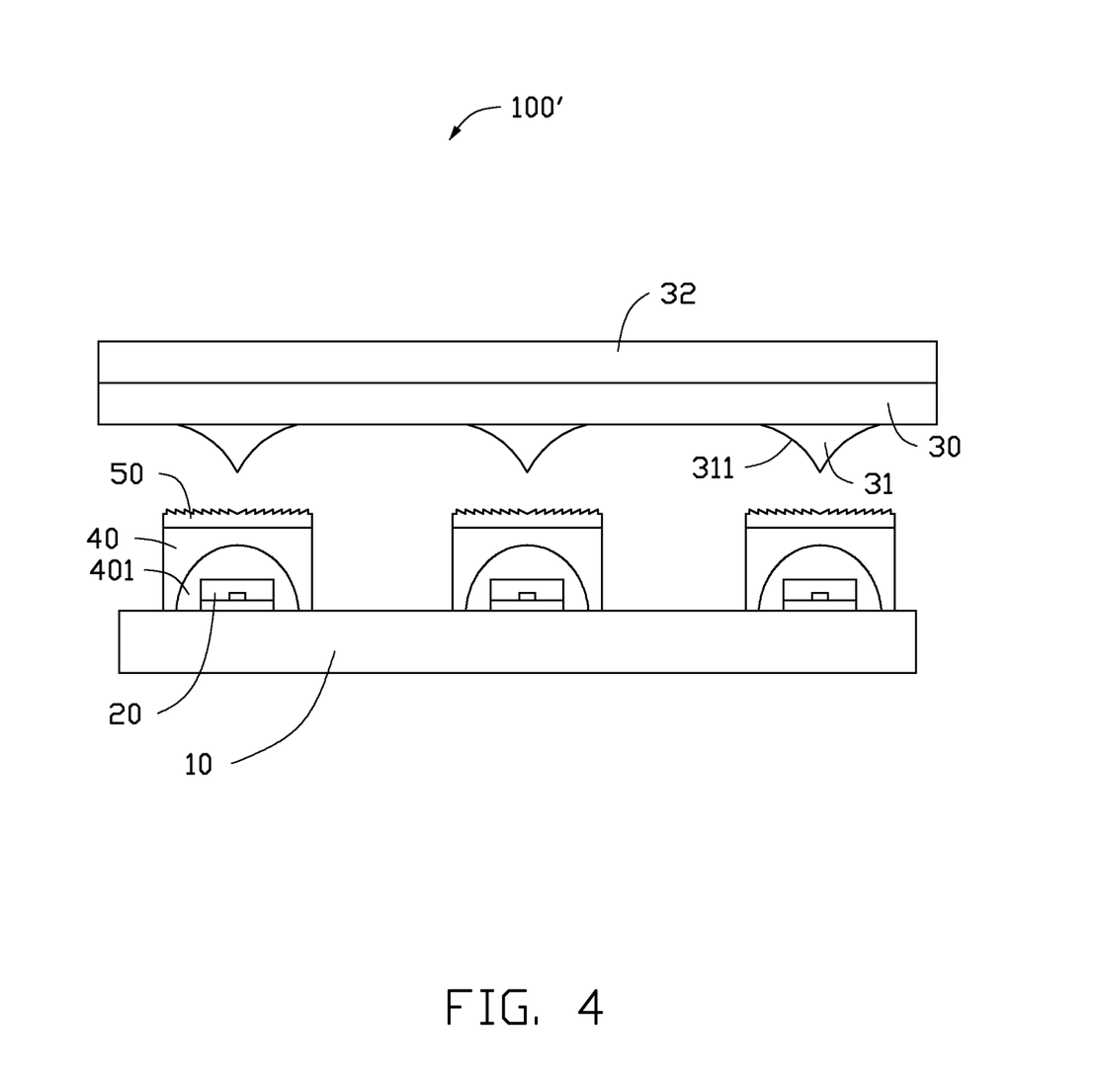
FIG. 4 is a schematic, assembled view of a backlight module in accordance with a second embodiment of the present disclosure.

Referring to FIG. 4, another backlight module 100' in accordance with a second embodiment is provided. The backlight module 100' further includes a plurality of covers 40 covering the LED packages 20 respectively, and a plurality of optical lens 50 arranged on the covers 40 respectively. In this embodiment, light emitted from the LED packages 20 can be further divergently refracted by the cover 40 and the optical lens 50 successively before emitted into the light diffusion board 30.

Each cover 40 is made of transparent material, such as epoxy. The cover 40 defines a cavity 401 therein, and the cavity 401 is recessed from a bottom surface of the cover 40 which connects the substrate 10 to a top end thereof away from the substrate 10. The cavity 401 is arc-shaped, and the cavity 401 receives the corresponding LED package 20 therein. An inner surface of the cavity 401 is spaced from the LED package 20. In this embodiment, the inner surface of the cavity 401 refracts light emitted from the LED package 20 into the lens 50 uniformly.

The lens 50 is located on the top surface of the cover 40, and light emitted into the lens 50 can be further refracted and diverged into the light diffusion board 30.

Figure 5:
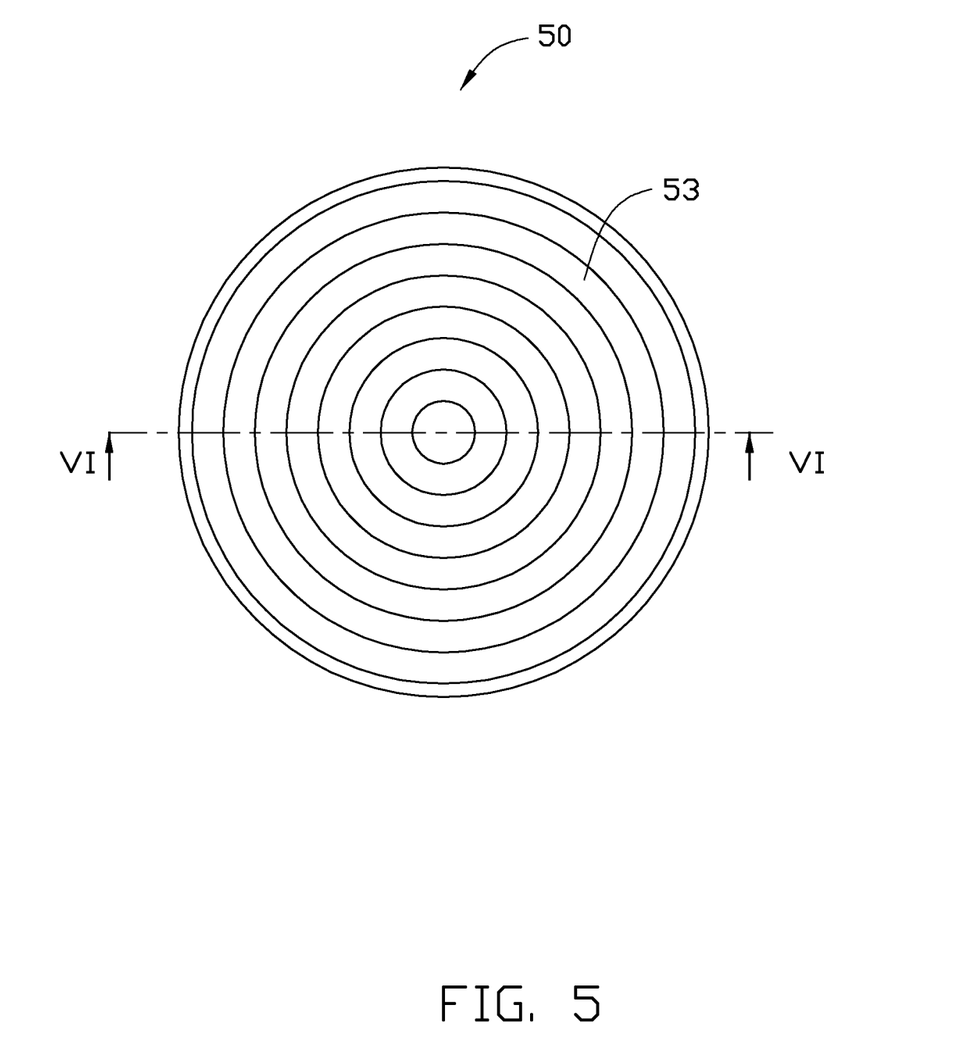
FIG. 5 is a top plan view of a lens of the backlight module of FIG. 4.
Figure 6:
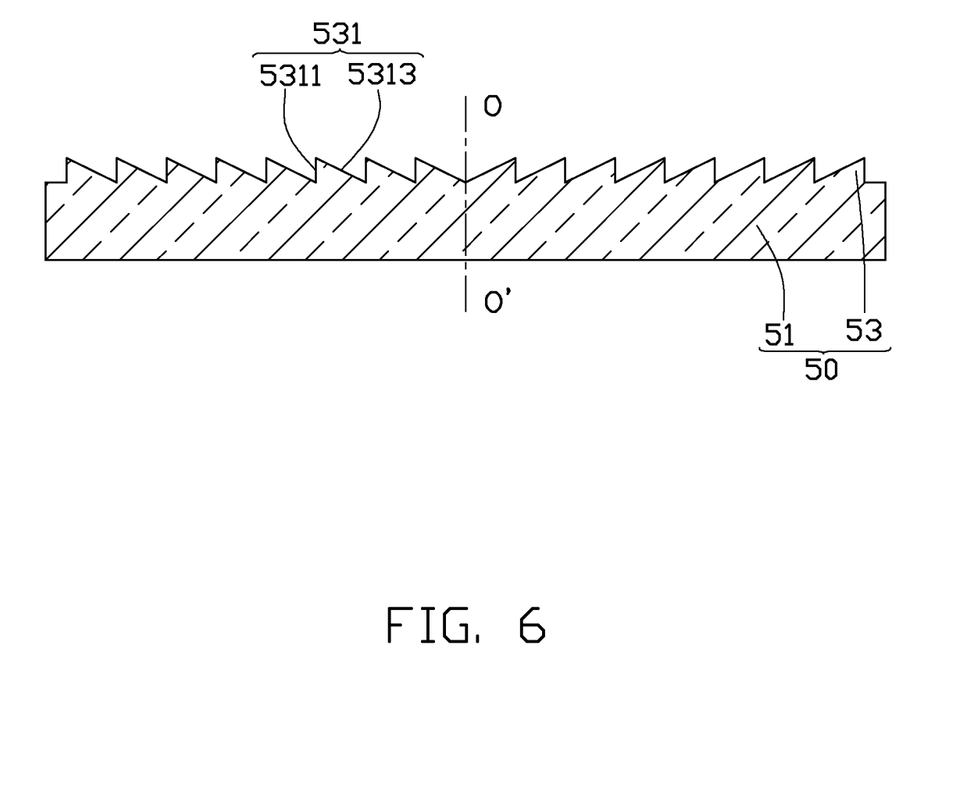
FIG. 6 is a cross-sectional view of the lens of FIG. 5, taken along a line VI-VI thereof.

Also referring to FIGS. 5-6, the lens is a Fresnel lens. The lens 50 is sustainably a circular plate, and is symmetrical about an axis O-O'. The lens 50 includes a main body 51 and a light-diverging part 53 formed on a top end of the main body 51. The main body 51 is disk-shaped, and a size of a bottom surface thereof equals to a top surface of the cover 40. As such, an outer periphery of the main body 51 is coplanar with an outer periphery of the cover 40.

The light-diverging part 53 includes a plurality of protruding portions 531 radiating outwardly from a center of the top end of the lens 50. The protruding portions 531 are a series of continuous concentric rings. An inner diameter of the protruding portions 531 are gradually increased outwardly from the axis O-O'.

A width of each circular protruding portion 531 is gradually increased from the outer end far away from the main body 51 to the inner end connecting the main body 51. Each circular protruding portion 531 includes a first surface 5311 perpendicular to the main body 51, and a second surface 5313 inclined from a top of the first surface 5313 toward the main body 51. In this embodiment, the second surface 5313 is inclined downwardly and inwardly toward the axis O-O'.

In this embodiment, a distance between the bottom surface 303 of the light diffusion board 30 and the LED chip 23 is varied from 15 millimeters (mm) to 40 millimeters (mm). Preferably, the distance between the bottom surface 303 and the LED chip 23 is 30 millimeters (mm).

Figure 7:
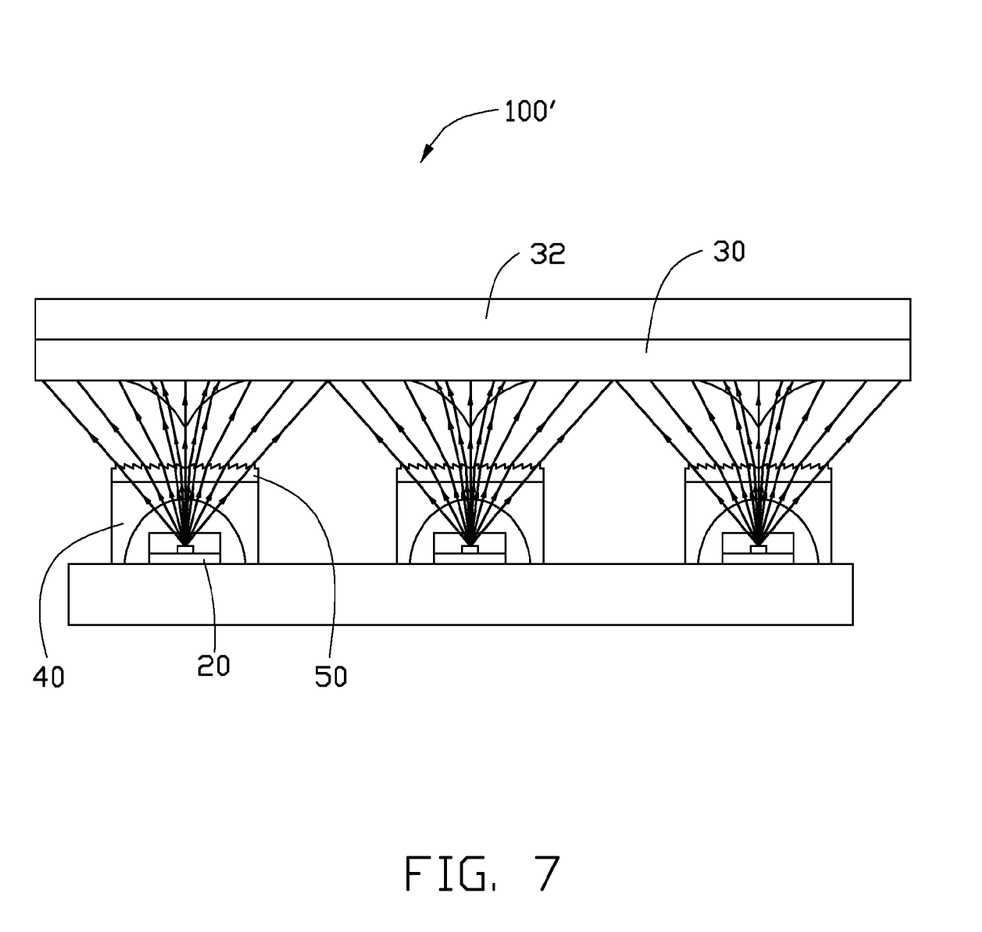
FIG. 7 shows light paths of the backlight module of FIG. 4.

Referring to FIG. 7, according to the backlight module 100', light emitted from the LED packages 20 travels into the inner surface of the cover 40, and the light is refracted divergently by the inner surface of the cover 40 into the lens 50 uniformly. And then, the light emitted into the lens 50 is refracted divergently and uniformly by the light-diverging part 53 into the light diffusion board 30. A part of light emitted from the lens 50 and located near the center of the lens 50 is further uniformly refracted by the corresponding light-guiding portion 31 to reach a periphery of a top end of the corresponding light-guiding portion 31, whereby the radiation angle of this part of light into the light diffusion board 30 can be enlarged. Another part of the light emitted from the lens 50 and located at a periphery of the lens 50 directly transmits into and is mixed in the regions of the light diffusion board 30 between adjacent light-guiding portions 31 and beside the corresponding light-guiding portion 31. As a result, the light emitted from the LED packages 20 are uniformly and divergently emitted into the light diffusion board 30, which increases the performance of the backlight module.

It is to be understood that the above-described embodiments are intended to illustrate rather than limit the disclosure. Variations may be made to the embodiments without departing from the spirit of the disclosure as claimed. The above-described embodiments illustrate the scope of the disclosure but do not restrict the scope of the disclosure.

What is claimed is:

1. A backlight module comprising:
   a substrate;
   a plurality of separate light emitting diode (LED) packages mounted on the substrate; and
   a light diffusion board located above the LED packages, the light diffusion board comprising a light incident surface oriented toward the LED packages and a light outputting surface opposite to the light incident surface, a plurality of light-guiding portions being configured extending from the incident surface of the light diffusion board, the light-guiding portions facing toward and aligned with the LED packages, respectively, each light-guiding portion comprising a concave surface, light emitting into the light-guiding portions being divergently refracted by the concave surfaces of the light-guiding portions into the light diffusion board;
   wherein each light-guiding portion is funnel shaped, and a diameter of the light-guiding portion is decreasing gradually from a top end connecting the light diffusion board to a bottom end facing toward a corresponding LED package.

2. The backlight module of claim 1, wherein the concave surface is recessed inwardly from an outer periphery of the light-guiding portion.

3. The backlight module of claim 2, wherein a curvature of the concave surface is varied from 0.5 mm-1 to 1.5 mm-1.

4. The backlight module of claim 1, wherein a light diffusion film is coated on the light output surface of the light diffusion board.

5. The backlight module of claim 1 further comprising covers covering the LED packages respectively, wherein each cover defines a cavity therein, and the cavity receives a corresponding LED therein.

6. The backlight module of claim 5, wherein light emitted from the corresponding LED package and into an inner surface of each cover defining the cavity is refracted divergently by the inner surface into the light diffusion board.

7. The backlight module of claim 6, wherein the cavity is arc-shaped, and is recessed from a bottom surface connecting the substrate toward a top surface far away from the substrate.

8. The backlight module of claim 6, wherein the distance between the LED chip and the light incident surface of the light diffusion board is 30 millimeters.

9. The backlight module of claim 5, wherein optical lenses are located on the covers respectively, light emitted from each cover and into a corresponding optical lens is refracted divergently by the corresponding optical lens into the light diffusion board.

10. The backlight module of claim 9, wherein each optical lens comprises a main body and a light-diverging part formed on a top end of the main body, and light emitted into the optical lens is refracted divergently into the light diffusion board by the light-diverging part.

11. The backlight module of claim 10, wherein each light-diverging part comprises a plurality of circular protruding portions radiating outwardly from a center of a corresponding optical lens.

12. The backlight module of claim 11, wherein each light-diverging part comprise a first surface perpendicular to the main body of the light-diverging part and a second surface inclined downwardly from a top of the first surface toward the main body.

13. The backlight module of claim 12, wherein the second surface is inclined inwardly from the top of the first surface toward the center of the corresponding optical lens.

14. The backlight module of claim 9, wherein each optical lens is a Fresnel lens.

15. The backlight module of claim 5, wherein each LED package comprises a metal base mounted on the substrate and an LED chip arranged on the metal base, and a distance between the LED chip and the light incident surface of the light diffusion board is varied from 15 millimeters to 40 millimeters.

16. A backlight module comprising:
a substrate;
a plurality of separate light emitting diode (LED) packages mounted on the substrate; and
a light diffusion board located above the LED packages, the light diffusion board comprising a light incident surface oriented toward the LED packages and a light outputting surface opposite to the light incident surface, a plurality of light-guiding portions being configured extending from the incident surface of the light diffusion board, the light-guiding portions facing toward and aligned with the LED packages, respectively, each light-guiding portion comprising a concave surface, light emitting into the light-guiding portions being divergently refracted by the concave surfaces of the light-guiding portions into the light diffusion board;
wherein the concave surface is recessed inwardly from an outer periphery of the light-guiding portion;
wherein a curvature of the concave surface is varied from 0.5 mm-1 to 1.5 mm-1;
wherein each light-guiding portion is funnel shaped, and a diameter of the light-guiding portion is decreasing gradually from a top end connecting the light diffusion board to a bottom end facing toward a corresponding LED package; and
wherein the backlight module further comprising covers covering the LED packages respectively, each cover defines a cavity therein, and the cavity receives a corresponding LED therein.

* * * * *